United States Patent
White

(10) Patent No.: US 9,139,297 B1
(45) Date of Patent: Sep. 22, 2015

(54) ROTOR BLADE SUBSYSTEMS ATTACHMENT

(75) Inventor: Robert Owen White, Orillia (CA)

(73) Assignee: GROEN BROTHERS AVIATION, INC., Salt Lake City, UT (US)

( * ) Notice: Subject to any disclaimer, the term of this patent is extended or adjusted under 35 U.S.C. 154(b) by 843 days.

(21) Appl. No.: 13/317,750

(22) Filed: Oct. 27, 2011
(Under 37 CFR 1.47)

Related U.S. Application Data

(63) Continuation-in-part of application No. 13/199,671, filed on Sep. 7, 2011, now Pat. No. 8,844,880, and a continuation-in-part of application No. 13/199,684, filed on Sep. 7, 2011, now Pat. No. 9,022,314, and a
(Continued)

(51) Int. Cl.
| | | |
|---|---|---|
| *B64C 11/24* | (2006.01) | |
| *B64C 27/473* | (2006.01) | |
| *B21D 53/78* | (2006.01) | |

(Continued)

(52) U.S. Cl.
CPC .............. *B64C 27/18* (2013.01); *B21D 53/78* (2013.01); *B21K 3/00* (2013.01); *B21K 3/04* (2013.01); *B64C 11/06* (2013.01); *B64C 11/20* (2013.01); *B64C 11/24* (2013.01); *B64C 27/473* (2013.01); *B64C 27/82* (2013.01); *B64C 15/14* (2013.01); *B64C 27/22* (2013.01); *B64C 27/24* (2013.01);
(Continued)

(58) Field of Classification Search
CPC ........ B64C 11/06; B64C 11/20; B64C 11/24; B64C 15/14; B64C 27/18; B64C 27/22; B64C 27/26; B64C 27/473; B64C 27/82; B21D 53/78; B21K 3/00; B21K 3/04

USPC ................... 29/889.6, 889.7, 889.71, 889.72, 29/889.721, 889.722; 156/78, 242, 245, 156/293, 294; 244/6, 17.11, 23 R, 123.1, 244/123.14, 123.8; 416/62, 90 A, 90 R, 92, 416/226, 232

See application file for complete search history.

(56) References Cited

U.S. PATENT DOCUMENTS

| | | | | |
|---|---|---|---|---|
| 1,947,901 | A | * | 2/1934 | La Cierva .......................... 244/8 |
| 2,352,342 | A | * | 6/1944 | Pitcairn .......................... 416/102 |

(Continued)

FOREIGN PATENT DOCUMENTS

| | | | | |
|---|---|---|---|---|
| GB | 831508 | A | * | 3/1960 |

OTHER PUBLICATIONS

Fairey Aviation Company, Fairey Rotodyne 40/44 Helicopter, Issue 1, May 1954.
(Continued)

*Primary Examiner* — Edward Look
*Assistant Examiner* — Christopher R Legendre
(74) *Attorney, Agent, or Firm* — Pate Baird, PLLC

(57) ABSTRACT

A rotor blade having conduits for supporting control lines is disclosed. The control lines extend from a rotor hub to a tip jet mounted near a distal end of the rotor blade. The conduits mount within leading and trailing edge fairings mounted to a blade spar. The conduits may be supported by bulkheads secured at discrete locations along the blade spar and secured to the leading and trailing edge fairings. The conduits may also be secured to support webs secured to the leading or trailing edge fairing and extending longitudinally therealong. The conduit may have a tapered inner surface and a tapered fitting may secure to the control line to engage the tapered inner surface.

16 Claims, 11 Drawing Sheets

Related U.S. Application Data continuation-in-part of application No. 13/199,678, filed on Sep. 7, 2011, and a continuation-in-part of application No. 13/199,682, filed on Sep. 7, 2011, now Pat. No. 8,931,728, and a continuation-in-part of application No. 13/199,681, filed on Sep. 7, 2011, now Pat. No. 8,950,699, and a continuation-in-part of application No. 13/199,677, filed on Sep. 7, 2011, now Pat. No. 8,939,394, and a continuation-in-part of application No. 13/199,679, filed on Sep. 7, 2011, now Pat. No. 8,668,162, and a continuation-in-part of application No. 13/199,720, filed on Sep. 7, 2011, and a continuation-in-part of application No. 13/199,719, filed on Sep. 7, 2011, now abandoned, and a continuation-in-part of application No. 13/199,721, filed on Sep. 7, 2011, now Pat. No. 8,915,465, and a continuation-in-part of application No. 13/199,705, filed on Sep. 7, 2011, now Pat. No. 8,973,863, and a continuation-in-part of application No. 13/199,712, filed on Sep. 7, 2011.

(60) Provisional application No. 61/460,572, filed on Jan. 3, 2011, provisional application No. 61/466,177, filed on Mar. 22, 2011, provisional application No. 61/409,475, filed on Nov. 2, 2010, provisional application No. 61/409,478, filed on Nov. 2, 2010, provisional application No. 61/409,476, filed on Nov. 2, 2010, provisional application No. 61/409,482, filed on Nov. 2, 2010, provisional application No. 61/409,470, filed on Nov. 2, 2010, provisional application No. 61/517,413, filed on Apr. 19, 2011, provisional application No. 61/468,964, filed on Mar. 29, 2011, provisional application No. 61/409,487, filed on Nov. 2, 2010, provisional application No. 61/409,494, filed on Nov. 2, 2010, provisional application No. 61/456,219, filed on Nov. 2, 2010, provisional application No. 61/456,221, filed on Nov. 2, 2010, provisional application No. 61/456,220, filed on Nov. 2, 2010, provisional application No. 61/432,448, filed on Jan. 13, 2011, provisional application No. 61/506,572, filed on Jul. 11, 2011, provisional application No. 61/519,075, filed on May 16, 2011, provisional application No. 61/519,055, filed on May 16, 2011, provisional application No. 61/460,573, filed on Jan. 4, 2011, provisional application No. 61/461,223, filed on Jan. 13, 2011, provisional application No. 61/429,282, filed on Jan. 3, 2011, provisional application No. 61/429,289, filed on Jan. 3, 2011, provisional application No. 61/575,196, filed on Aug. 17, 2011, provisional application No. 61/499,996, filed on Jun. 22, 2011, provisional application No. 61/575,204, filed on Aug. 18, 2011, provisional application No. 61/532,233, filed on Sep. 8, 2011, provisional application No. 61/539,668, filed on Sep. 27, 2011, provisional application No. 61/626,783, filed on Oct. 3, 2011, provisional application No. 61/381,291, filed on Sep. 9, 2010, provisional application No. 61/403,099, filed on Sep. 9, 2010, provisional application No. 61/403,097, filed on Sep. 9, 2010, provisional application No. 61/381,313, filed on Sep. 9, 2010, provisional application No. 61/403,111, filed on Sep. 9, 2010, provisional application No. 61/381,347, filed on Sep. 9, 2010, provisional application No. 61/403,136, filed on Sep. 9, 2010, provisional application No. 61/403,134, filed on Sep. 9, 2010, provisional application No. 61/403,098, filed on Sep. 9, 2010, provisional application No. 61/403,081, filed on Sep. 9, 2010, provisional application No. 61/403,135, filed on Sep. 9, 2010, provisional application No. 61/403,113, filed on Sep. 9, 2010.

(51) Int. Cl.
  *B21K 3/00* (2006.01)
  *B21K 3/04* (2006.01)
  *B64C 11/06* (2006.01)
  *B64C 27/18* (2006.01)
  *B64C 11/20* (2006.01)
  *B64C 27/82* (2006.01)
  *B64C 27/22* (2006.01)
  *B64C 27/24* (2006.01)
  *B64C 27/26* (2006.01)
  *B64C 15/14* (2006.01)

(52) U.S. Cl.
  CPC ......... *B64C 27/26* (2013.01); *B64C 2027/8245* (2013.01)

(56) References Cited

U.S. PATENT DOCUMENTS

| | | | | |
|---|---|---|---|---|
| 2,460,351 | A * | 2/1949 | Hoffman et al. | 416/145 |
| 2,485,502 | A * | 10/1949 | McCollum | 416/21 |
| 2,568,230 | A * | 9/1951 | Gluhareff | 416/225 |
| 2,574,980 | A * | 11/1951 | Meyers | 416/226 |
| 2,589,193 | A * | 3/1952 | Mayne | 244/134 B |
| 2,601,463 | A | 6/1952 | Stanley | |
| 2,606,728 | A * | 8/1952 | Sikorsky | 244/134 B |
| 2,754,915 | A * | 7/1956 | Echeverria, Jr. | 416/226 |
| 2,954,828 | A * | 10/1960 | Marchetti | 416/226 |
| 2,981,337 | A * | 4/1961 | Stuart, III | 416/226 |
| 3,093,219 | A * | 6/1963 | Ramme | 138/117 |
| 3,096,826 | A * | 7/1963 | Amer et al. | 416/20 R |
| 3,161,238 | A * | 12/1964 | Key | 416/226 |
| 3,321,020 | A * | 5/1967 | Pfleiderer et al. | 416/88 |
| 3,333,642 | A * | 8/1967 | Kee | 416/226 |
| 3,402,772 | A * | 9/1968 | Sobanik | 416/144 |
| 3,433,306 | A * | 3/1969 | Stanley | 416/226 |
| 3,494,424 | A | 2/1970 | Stanley | |
| 3,699,771 | A * | 10/1972 | Chelminski | 60/39.35 |
| 3,957,226 | A | 5/1976 | Daggett, Jr. et al. | |
| 4,099,671 | A | 7/1978 | Leibach | |
| 4,200,252 | A | 4/1980 | Logan et al. | |
| 4,452,658 | A * | 6/1984 | Schramm | 156/245 |
| 4,589,611 | A | 5/1986 | Ramme et al. | |
| 5,209,430 | A | 5/1993 | Wilson et al. | |
| 5,301,900 | A * | 4/1994 | Groen et al. | 244/17.25 |
| 5,934,873 | A * | 8/1999 | Greene | 416/22 |
| 6,352,220 | B1 | 3/2002 | Banks et al. | |
| 6,453,669 | B2 * | 9/2002 | Kennedy et al. | 60/527 |
| 7,147,182 | B1 | 12/2006 | Flanigan | |
| 7,740,452 | B2 * | 6/2010 | Mueller et al. | 416/226 |
| 2009/0095842 | A1 * | 4/2009 | Gaertner et al. | 244/134 D |
| 2012/0156050 | A1 * | 6/2012 | White | 416/226 |
| 2014/0072431 | A1 * | 3/2014 | Smith et al. | 416/170 R |

OTHER PUBLICATIONS

G.S. Hislop, The Fairey Rotodyne, A paper to be presented to a Joint Meeting of the Helicopter Association of Great Britain, Nov. 7, 1958.
Fairey Aviation Company, The Fairey Rotodyne 40-48 Passenger Helicopter, England, estimated 1959.
Journal of the Helicopter Association of Great Britain, vol. 13, No. 6, Dec. 1959.
The Journal of the Helicopter Association of Great Britain, vol. 3, No. 3, 1949.
Fairey Aviation Limited, Fairey Rotodyne Design Z, estimated 1959.
Journal of the Royal Aeronautical Society, London, Feb. 1958.
Fairey Aviation Company, Fairey Rotodyne, Weights and performance Index, estimated 1959.

(56) References Cited

OTHER PUBLICATIONS

Fairey Aviation Company, The Fairey Rotodyne Design Certificate, estimated 1959.
Fairey Aviation Company, Tactical Mobility, Fairey Rotodyne for the Services, estimated 1959.
Fairey Rotodyne, Type 20Z 10W and Performance, Technical Publications, Project 79, Issue 2, Feb. 1959.
Fairey Rotodyne Description Drawings, estimated 1959.
Fairey Rotodyne Description Specs, estimated 1959.
J.W. Young, Dr. D.B. Leason, Mr. Gledhill, Fairey Rotodyne Design Y Drag Tip Jet Fairing, Dec. 1, 1958.
Franklin D. Harris et al., The XV-1's Rotor System, AHS International, Jan. 21-24, 2004.
Franklin D. Harris, An Overview of Autogyros and the McDonnell XV-1 Convertiplane, NASA/CR, Oct. 2003.
David H. Hickey, NACA Research Memorandum, Full Scale Wind Tunnel Tests, National Advisory Committee for Aeronautics, May 17, 1956.
S. Coham et al., XV-9A Hot Cycle Research Aircraft Program Summary, U.S. Army Aviation Material Laboratories, Fort Eustis, Virginia, Jun. 1966.

* cited by examiner

ROTOR BLADE SUBSYSTEMS ATTACHMENT

RELATED APPLICATIONS

This application claims the benefit of U.S. Provisional Patent Application Ser. No. 61/456,221, filed on Nov. 2, 2010. This application incorporates by reference all of the following applications: U.S. Provisional Patent Application Ser. No. 61/460,572, filed on Jan. 3, 2011, U.S. Provisional Patent Application Ser. No. 61/466,177, filed on Mar. 22, 2011, U.S. Provisional Patent Application Ser. No. 61/409,475, filed on Nov. 2, 2010, U.S. Provisional Patent Application Ser. No. 61/409,478, filed on Nov. 2, 2010, U.S. Provisional Patent Application Ser. No. 61/409,476, filed on Nov. 2, 2010, U.S. Provisional Patent Application Ser. No. 61/409,482, filed on Nov. 2, 2010, U.S. Provisional Patent Application Ser. No. 61/409,470, filed on Nov. 2, 2010, U.S. Provisional Patent Application Ser. No. 61/517,413, filed on Apr. 19, 2011, U.S. Provisional Patent Application Ser. No. 61/468,964, filed on Mar. 29, 2011, U.S. Provisional Patent Application Ser. No. 61/409,487, filed on Nov. 2, 2010, U.S. Provisional Patent Application Ser. No. 61/409,494, filed on Nov. 2, 2010, U.S. Provisional Patent Application Ser. No. 61/456,219, filed on Nov. 2, 2010, U.S. Provisional Patent Application Ser. No. 61/456,220, filed on Nov. 2, 2010, U.S. Provisional Patent Application Ser. No. 61/432,488, filed on Jan. 13, 2011, U.S. Provisional Patent Application Ser. No. 61/506,572, filed on Jul. 11, 2011, U.S. Provisional Patent Application Ser. No. 61/519,075, filed on May 16, 2011, U.S. Provisional Patent Application Ser. No. 61/519,055, filed on Aug. 22, 2011, U.S. Provisional Patent Application Ser. No. 61/460,573, filed on Jan. 4, 2011, U.S. Provisional Patent Application Ser. No. 61/461,223, filed on Jan. 13, 2011, U.S. Provisional Patent Application Ser. No. 61/429,282, filed on Jan. 3, 2011, U.S. Provisional Patent Application Ser. No. 61/429,289, filed on Jan. 3, 2011, U.S. Provisional Patent Application Ser. No. 61/575,196, filed on Aug. 17, 2011, U.S. Provisional Patent Application Ser. No. 61/499,996, filed on Jun. 22, 2011, U.S. Provisional Patent Application Ser. No. 61/575,204, filed on Aug. 17, 2011, U.S. Provisional Patent Application Ser. No. 61/532,233, filed on Sep. 8, 2011, U.S. Provisional Patent Application Ser. No. 61/539,668, filed on Sep. 27, 2011, and U.S. Provisional Patent Application Ser. No. 61/626,783, filed on Oct. 3, 2011; and is a continuation-in-part of co-pending U.S. patent application Ser. No. 13/199,671, filed on Sep. 7, 2011, which claims the benefit of U.S. Provisional Patent Application Ser. No. 61/381,291, filed on Sep. 9, 2010, co-pending U.S. patent application Ser. No. 13/199,684, filed on Sep. 7, 2011, which claims the benefit of U.S. Provisional Patent Application Ser. No. 61/403,099, filed on Sep. 9, 2010, co-pending U.S. patent application Ser. No. 13/199,678, filed on Sep. 7, 2011, which claims the benefit of U.S. Provisional Patent Application Ser. No. 61/403,097, filed on Sep. 9, 2010, co-pending U.S. patent application Ser. No. 13/199,682, filed on Sep. 7, 2011, which claims the benefit of U.S. Provisional Patent Application Ser. No. 61/381,313, filed on Sep. 9, 2010, co-pending U.S. patent application Ser. No. 13/199,681, filed on Sep. 7, 2011, which claims the benefit of U.S. Provisional Patent Application Ser. No. 61/403,111, filed on Sep. 9, 2010, co-pending U.S. patent application Ser. No. 13/199,677, filed on Sep. 7, 2011, which claims the benefit of U.S. Provisional Patent Application Ser. No. 61/381,347, filed on Sep. 9, 2010, co-pending U.S. patent application Ser. No. 13/199,679, filed on Sep. 7, 2011, which claims the benefit of U.S. Provisional Patent Application Ser. No. 61/403,136, filed on Sep. 9, 2010, co-pending U.S. patent application Ser. No. 13/199,720, filed on Sep. 7, 2011, which claims the benefit of U.S. Provisional Patent Application Ser. No. 61/403,134, filed on Sep. 9, 2010, co-pending U.S. patent application Ser. No. 13/199,719, filed on Sep. 7, 2011, which claims the benefit of U.S. Provisional Patent Application Ser. No. 61/403,098, filed on Sep. 9, 2010, co-pending U.S. patent application Ser. No. 13/199,721, filed on Sep. 7, 2011, which claims the benefit of U.S. Provisional Patent Application Ser. No. 61/403,081, filed on Sep. 9, 2010, co-pending U.S. patent application Ser. No. 13/199,705, filed on Sep. 7, 2011, which claims the benefit of U.S. Provisional Patent Application Ser. No. 61/403,135, filed on Sep. 9, 2010, co-pending U.S. patent application Ser. No. 13/199,712, filed on Sep. 7, 2011, which claims the benefit of U.S. Provisional Patent Application Ser. No. 61/403,113, filed on Sep. 9, 2010, all of which are hereby incorporated by reference.

Additionally, this patent application hereby incorporates by reference U.S. Pat. No. 5,301,900 issued Apr. 12, 1994 to Groen et al., U.S. Pat. No. 1,947,901 issued Feb. 20, 1934 to J. De la Cierva, and U.S. Pat. No. 2,352,342 issued Jun. 27, 1944 to H.F. Pitcairn.

RIGHTS OF U.S. GOVERNMENT

This invention was made with Government support under Agreement No. HR0011-06-9-0002 awarded by DARPA. The Government has certain rights in the invention.

BACKGROUND

1. The Field of the Invention

This invention relates to rotating wing aircraft (rotorcraft), and, more particularly to rotorcraft relying on autorotation of a rotor to provide lift.

2. The Background Art

Rotorcraft rely on a rotating wing to provide lift. In contrast, fixed wing aircraft rely on air flow over a fixed wing to provide lift. Fixed wing aircraft must therefore achieve a minimum ground velocity on takeoff before the lift on the wing is sufficient to overcome the weight of the plane. Fixed wing aircraft therefore generally require a long runway along which to accelerate to achieve this minimum velocity and takeoff.

In contrast, rotorcraft can take off and land vertically or along short runways inasmuch as powered rotation of the rotating wing provides the needed lift. This makes rotorcraft particularly useful for landing in urban locations or undeveloped areas without a proper runway.

The most common rotorcraft in use today are helicopters. A helicopter typically includes a fuselage or airframe, housing an engine and passenger compartment, and a rotor, driven by the engine, to provide lift. Forced rotation of the rotor causes a reactive torque on the airframe. Accordingly, conventional helicopters require either two counter rotating rotors or a tail rotor in order to counteract this reactive torque.

Another type of rotorcraft is the autogyro. An autogyro aircraft derives lift from an unpowered, freely rotating rotor or plurality of rotary blades. The energy to rotate the rotor results from a windmill-like effect of air passing through the underside of the rotor. The forward movement of the aircraft comes in response to a thrusting engine such as a motor driven propeller mounted fore or aft.

During the developing years of aviation aircraft, autogyro aircraft were proposed to avoid the problem of aircraft stalling in flight and to reduce the need for runways. The relative airspeed of the rotating wing is independent of the forward airspeed of the autogyro, allowing slow ground speed for takeoff and landing, and safety in slow-speed flight. Engines may be tractor-mounted on the front of an autogyro or pusher-mounted on the rear of the autogyro.

Airflow passing the rotary wing, alternately called rotor blades, which are tilted upward toward the front of the autogyro, act somewhat like a windmill to provide the driving force to rotate the wing, i.e. autorotation of the rotor. The Bernoulli effect of the airflow moving over the rotor surface creates lift.

Various autogyro devices in the past have provided some means to begin rotation of the rotor prior to takeoff, thus further minimizing the takeoff distance down a runway. One type of autogyro is the "gyrodyne," which includes a gyrodyne built by Fairey aviation in 1962 and the XV-1 convertiplane first flight tested in 1954. The gyrodyne includes a thrust source providing thrust in a flight direction and a large rotor for providing autorotating lift at cruising speeds. To provide initial rotation of the rotor, jet engines were secured to the tip of each blade of the rotor and powered during takeoff, landing, and hovering.

Although rotorcraft provide the significant advantage of vertical takeoff and landing (VTOL), they are much more limited in their maximum flight speed than are fixed wing aircraft. The primary reason that prior rotorcraft are unable to achieve high flight speed is a phenomenon known as "retreating blade stall." As the airframe of the rotorcraft moves in a flight direction, rotation of the rotor causes each blade thereof to be either "advancing" or "retreating."

That is, in a fixed-wing aircraft, all wings move forward in fixed relation, with the airframe. In a rotary-wing aircraft, the airframe moves forward with respect to the air. However, rotor blades on both sides move with respect to the airframe. Thus, the velocity of any point on any blade is the velocity of that point, with respect to the airframe, plus the velocity of the airframe. A blade is advancing if it is moving in the same direction as the flight direction. A blade is retreating if it is moving opposite the flight direction.

The rotor blades are airfoils that provide lift that depends on the speed of air flow thereover. The advancing blade therefore experiences much greater lift than the retreating blade. One technical solution to this problem is that the blades of the rotors are allowed to "flap." That is, the advancing blade is allowed to fly or flap upward in response to the increased air speed thereover such that its blade angle of attack is reduced. This reduces the lift exerted on the blade. The retreating blade experiences less air speed and tends to fly or flap downward such that its blade angle of attack is increased, which increases the lift exerted on the blade.

Flap enables rotorcraft to travel in a direction perpendicular to the axis of rotation of the rotor. However, lift equalization due to flapping is limited by a phenomenon known as "retreating blade stall." As noted above, flapping of the rotor blades increases the angle of attack of the retreating blade. However, at certain higher speeds, the increase in the blade angle of attack required to equalize lift on the advancing and retreating blades results in loss of lift (stalling) of the retreating blade.

A second limit on the speed of rotorcraft is the drag at the tips of the rotor. The tip of the advancing blade is moving at a speed equal to the speed of the aircraft and relative to the air, plus the speed of the tip of the blade with respect to the aircraft. That is equal to the sum of the flight speed of the rotorcraft plus the product of the length of the blade and the angular velocity of the rotor. In helicopters, the rotor is forced to rotate in order to provide both upward lift and thrust in the direction of flight. Increasing the speed of a helicopter therefore increases the air speed at the rotor or blade tip, both because of the increased flight speed and the increased angular velocity of the rotors required to provide supporting thrust.

The air speed over the tip of the advancing blade can therefore exceed the speed of sound even though the flight speed is actually much less. As the air speed over the tip approaches the speed of sound, the drag on the blade becomes greater than the engine can overcome. In autogyro aircraft, the tips of the advancing blades are also subject to this increased drag, even for flight speeds much lower than the speed of sound. The tip speed for an autogyro is typically smaller than that of a helicopter, for a given airspeed, since the rotor is not driven. Nevertheless, the same drag increase occurs eventually.

A third limit on the speed of rotorcraft is reverse air flow over the retreating blade. As noted above, the retreating blade is traveling opposite the flight direction with respect to the airframe. At certain high speeds, portions of the retreating blade are moving rearward, with respect to the airframe, slower than the flight speed of the airframe. Accordingly, the direction of air flow over these portions of the retreating blade is reversed from that typically designed to generate positive lift. Air flow may instead generate a negative lift, or downward force, on the retreating blade. For example, if the blade angle of attack is upward with respect to wind velocity, but wind is moving over the wing in a reverse direction, the blade may experience negative lift.

The ratio of the maximum air speed of a rotorcraft to the maximum air speed of the tips of the rotor blades is known as the "advance ratio. The maximum advance ratio of rotary wing aircraft available today is less than 0.5, which generally limits the top flight speed of rotary wing aircraft to less than 200 miles per hour (mph). For most helicopters, that maximum achievable advance ratio is between about 0.3 and 0.4. In view of the foregoing, it would be an advancement in the art to provide a rotorcraft capable of vertical takeoff and landing and flight speeds in excess of 200 mph.

BRIEF SUMMARY OF THE INVENTION

The invention has been developed in response to the present state of the art and, in particular, in response to the problems and needs in the art that have not yet been fully solved by currently available apparatus and methods. The features and advantages of the invention will become more fully apparent from the following description and appended claims, or may be learned by practice of the invention as set forth hereinafter.

In one aspect of the invention, a rotor blade for a rotorcraft includes a blade spar having upper and lower surfaces. A leading edge fairing is secured to the blade spar and extends between the upper and lower surfaces. A trailing edge fairing is secured to the blade spar opposite the leading edge fairing and extends between the upper and lower surfaces. The upper and lower surfaces, leading edge fairing, and trailing edge fairing define an airfoil contour. At least one conduit extends between at least one of the leading edge fairing and the blade spar and the trailing edge fairing and the blade spar. The blade spar defines a proximal end and a distal end. A tip jet is mounted at the distal end of the blade spar and a control line extends through the conduit and is coupled to the tip jet. The blade spar may define an air duct in fluid communication with an air intake of the tip jet. The control line may be a fuel line, electrical line, or cable.

In another aspect of the invention, the control line is a cable that is intersected by a neutral bending plane of the rotor blade.

In another aspect of the invention, a plurality of bulkheads are positioned between at least one of the leading edge fairing and the blade spar and the trailing edge fairing and the blade spar. The at least one conduit extends through the plurality of bulkhead and the plurality of bulkheads engage one or more of the blade spar, leading edge fairing, and trailing edge fairing to support the conduit. The locations of the bulkheads may be effective to maintain one or more of frequency response properties, flexural properties, and weight distribution properties, of the rotor blade within a tolerance of optimum values.

In another aspect of the invention, at least one web engages the at least one conduit and secures the at least one conduit to one of the leading edge fairing and the trailing edge fairing. The at least one web and the leading and trailing edge fairings may include a composite material and may be bonded to one another by means of co-curing. A thermally expandable foam may be positioned between the web and one of the leading and trailing edge fairings.

In another aspect of the invention, the conduit has a tapered inner surface and a tapered fitting is positioned within the conduit. A cable is positioned within the tapered fitting and may include a sheath adhered to the tapered fitting.

Corresponding methods of manufacture are also disclosed and claimed herein.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
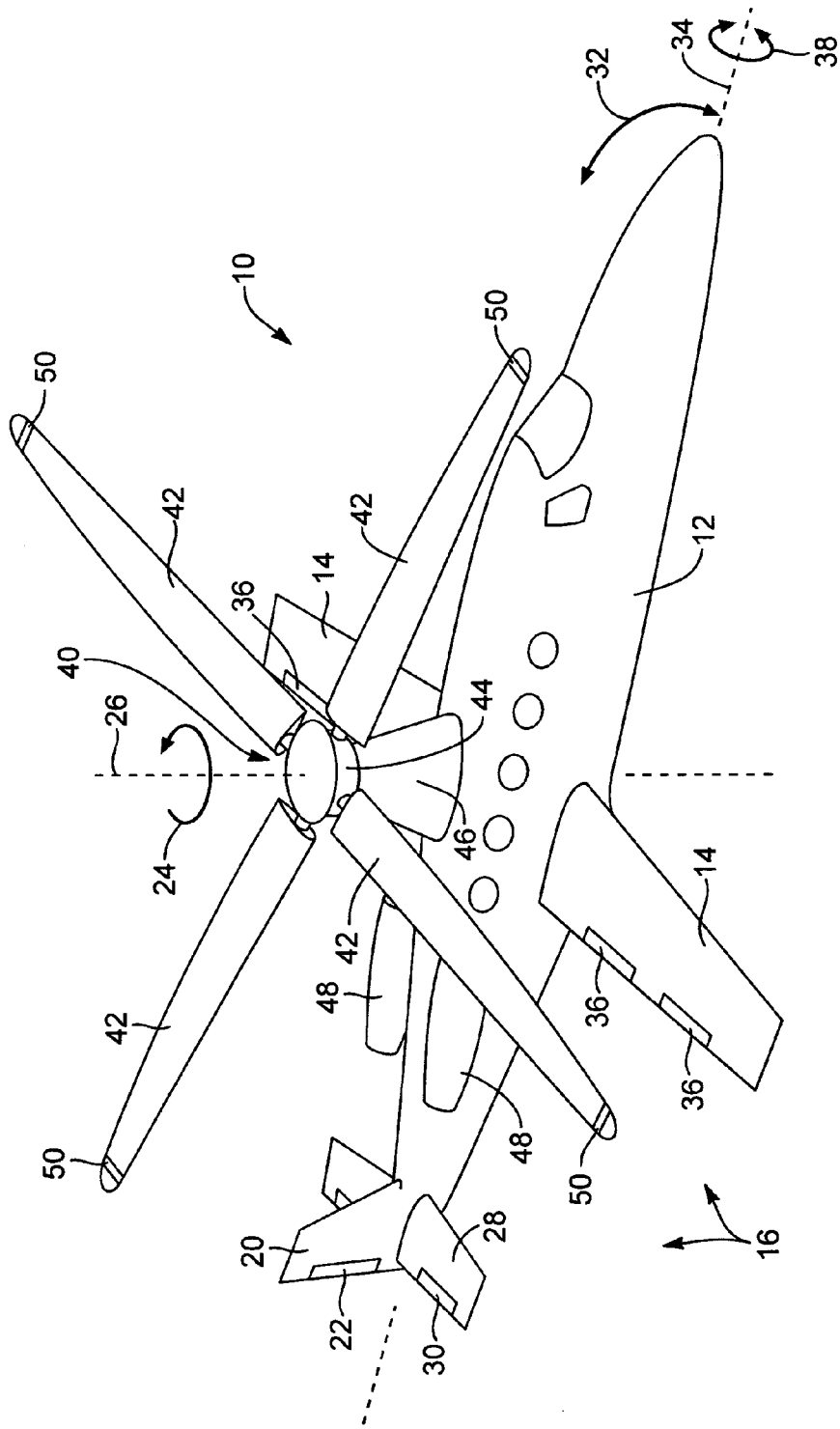
FIG. 1 is an isometric view of an aircraft in accordance with the present invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

This patent application hereby incorporates by reference U.S. Pat. No. 5,301,900 issued Apr. 12, 1994 to Groen et al., U.S. Pat. No. 1,947,901 issued Feb. 20, 1934 to J. De la Cierva, and U.S. Pat. No. 2,352,342 issued Jun. 27, 1944 to H.F. Pitcairn.

Referring to FIG. 1, an aircraft 10 includes an airframe 12 defining a cabin for carrying an operator, passengers, cargo, or the like. The airframe 12 may include one or more fixed wings 14 shaped as airfoils for providing lift to the aircraft. The wings 14 may be configured such that they provide sufficient lift to overcome the weight of the aircraft 10 only at comparatively high speeds inasmuch as the aircraft 10 is capable of vertical takeoff and landing (VTOL) and does not need lift from the fixed wings 14 at low speeds, e.g. below 50 mph or even 100 mph upon taking off.

In this manner, the wings 14 may be made smaller than those of fixed wing aircraft requiring a high velocity takeoff, which results in lower drag at higher velocities. In some embodiments the wings 14 provide sufficient lift to support at least 50 percent, preferably 90 percent, of the weight of the aircraft 10 at air speeds above 200 mph.

Control surfaces 16 may secure to one or both of the airframe 12 and wings 14. For example a tail structure 18 may include one or more vertical stabilizers 20 and one or more rudders 22. The rudders 22 may be adjustable as known in the art to control the yaw 24 of the aircraft 10 during flight. As known in the art, yaw 24 is defined as rotation about a vertical axis 26 of the aircraft 10. In the illustrated embodiment, the rudders 22 may comprise hinged portions of the vertical stabilizers 20.

The tail structure 18 may further include a horizontal stabilizer 28 and an elevator 30. The elevator 30 may be adjustable as known in the art to alter the pitch 32 of the aircraft 10. As known in the art, pitch 32 is defined as rotation in a plane containing the vertical axis 26 and a longitudinal axis 34 of the airframe of an aircraft 10. In the illustrated embodiment, the elevator 30 is a hinged portion of the horizontal stabilizer 28. In some embodiments, twin rudders 22 may be positioned at an angle relative to the vertical axis 26 and serve both to adjust the yaw 24 and pitch 32 of the aircraft 10.

The control surfaces 16 may also include ailerons 36 on the wings 14. As known in the art, ailerons 36 are used to control roll 38 of the airplane. As known in the art, roll 38 is defined as rotation about the longitudinal axis 34 of the aircraft 10.

Lift during vertical takeoff and landing and for augmenting lift of the wings 14 during flight is provided by a rotor 40 comprising a number of individual blades 42. The blades are mounted to a rotor hub 44. The hub 44 is coupled to a mast 46 which couples the rotor hub 44 to the airframe 12. The rotor 40 may be selectively powered by one or more engines 48 housed in the airframe 12, or adjacent nacelles, and coupled to the rotor 40. In some embodiments, jets 50 located at or near the tips of the blades 42 power the rotor 40 during takeoff, landing, hovering, or when the flight speed of the aircraft is insufficient to provide sufficient autorotation to develop needed lift.

Figure 2:
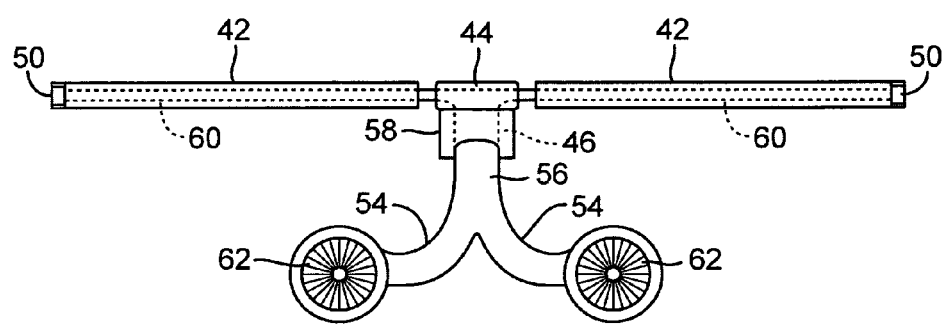
FIG. 2 is a front elevation view of a compressed or otherwise pressurized air supply for a tip jet in accordance with the present invention.

Referring to FIG. 2, while still referring to FIG. 1, in the illustrated embodiment, the engines 48 may be embodied as jet engines 48 that provide thrust during flight of the aircraft. The jet engines 48 may additionally supply compressed air to the jets 46 by driving a bypass turbine 62 or auxiliary compressor. Air compressed by the bypass turbine 62 may be transmitted through ducts 54 to a plenum 56 in fluid communication with the ducts 54.

The plenum 56 is in fluid communication with the mast 46 that is hollow or has another passage to provide for air conduction. A mast fairing 58 positioned around the mast 46 may provide one or both of an air channel and a low drag profile for the mast 46. The mast 46 or mast fairing 58 is in fluid communication with the rotor hub 44. The rotor hub 44 is in fluid communication with blade ducts 60 extending longitudinally through the blades 42 to feed the tip jets 50.

Figure 3A:
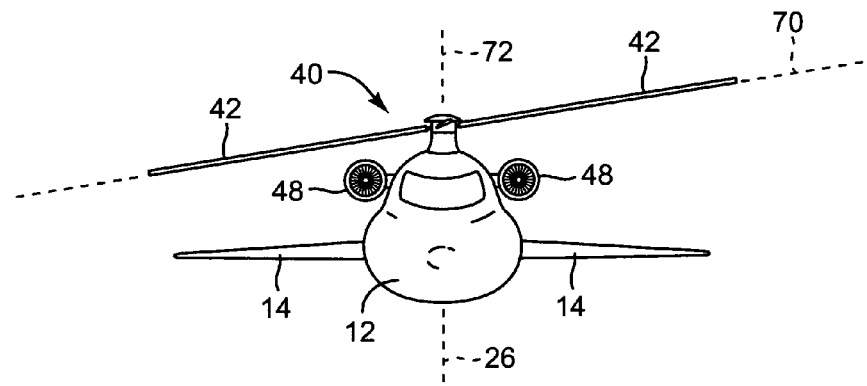
FIG. 3A is a front elevation view of a rotor craft illustrating operational parameters describing a rotor configuration suitable for use with an apparatus and method in accordance with the present invention and the system of FIGS. 1 and 2 in particular.
Figure 3B:
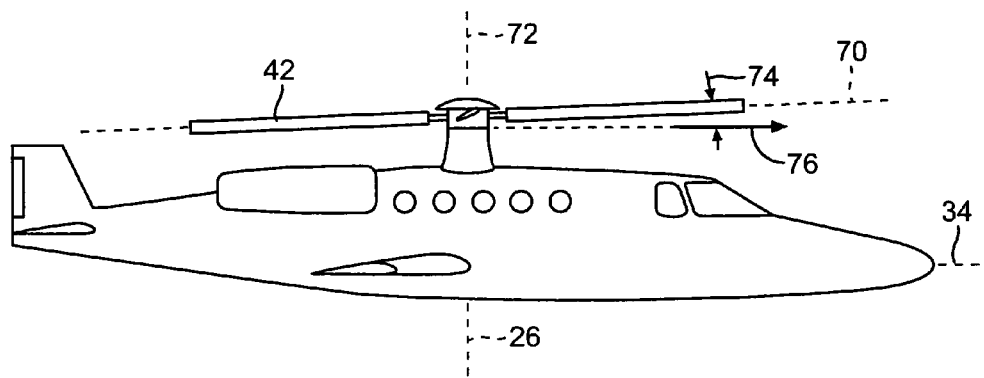
FIG. 3B is a right side elevation view of the rotor craft of FIG. 3A.
Figure 3C:
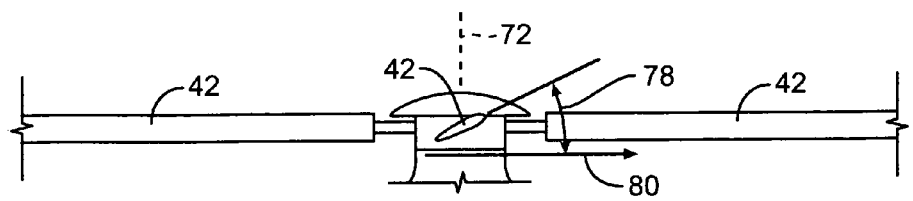
FIG. 3C is a partial cut of a right side elevation view of the rotor of FIG. 3A.

Referring to FIGS. 3A-3C, rotation of the rotor 40 about its axis of rotation 72 occurs in a rotor disc 70 that is generally planar but may be contoured due to flexing of the blades 42 during flight. In general, the rotor disc 70 may be defined as a plane in which the tips of the blades 42 travel. Inasmuch as the blades 42 flap cyclically upward and downward due to changes in lift while advancing and retreating, the rotor disc 70 is angled with respect to the axis of rotation when viewed along the longitudinal axis 34, as shown in FIG. 3A.

Referring to FIG. 3B, the angle 74 of the rotor disc 70, relative to a flight direction 76 in the plane containing the longitudinal axis 34 and vertical axis 26, is defined as the angle of attack 74 or rotor disk angle of attack 74. For purposes of this application, flight direction 76 and air speed refer to the direction and speed, respectively, of the airframe 12 of the aircraft 10 relative to surrounding air. In autogyro systems, the angle of attack 74 of the rotor disc 70 is generally positive in order to achieve autorotation of the rotor 40, which in turn generates lift.

Referring to FIG. 3C, the surfaces of the blades 42, and particularly the chord of each blade 42, define a pitch angle 78, or blade angle of attack 78, relative to the direction of movement 80 of the blades 42. In general, a higher pitch angle 78 will result in more lift and higher drag on the blade up to the point where stalling occurs, at which point lift has declined below a value necessary to sustain flight. the pitch angle 78 of the blade 42 may be controlled by both cyclic and collective pitch control as known in the art of rotary wing aircraft design.

Figure 4:
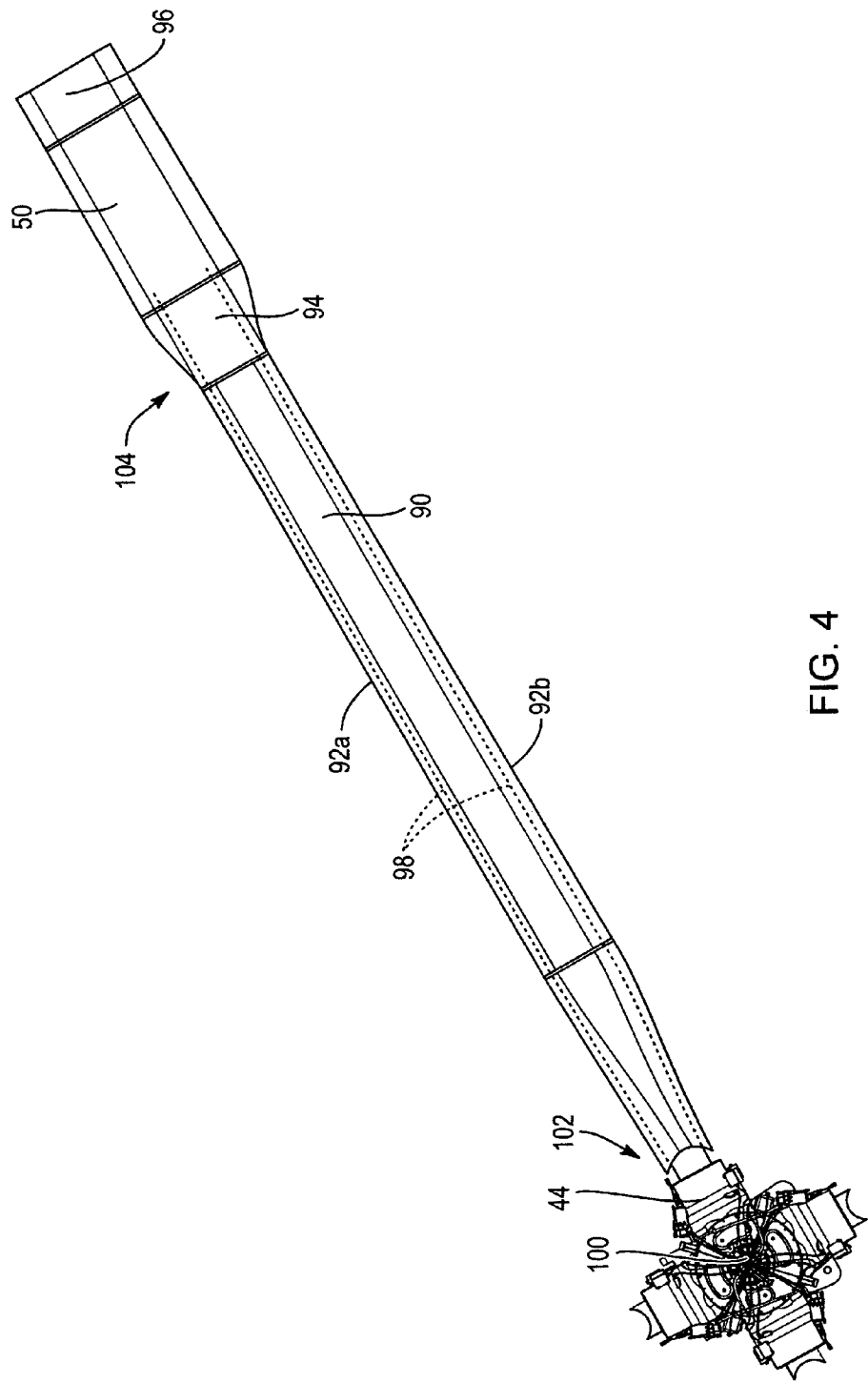
FIG. 4 is a top plan view of a rotor blade and hub in accordance with the present invention.

Referring to FIG. 4, the blades 42 may include a blade spar 90 providing the primary structural support for the blade 42. The blade spar 90 may be formed of a composite material and may be hollow such that the blade spar 90 also forms the blade duct 60 of the blade 42. The blade spar 90 may have a cross section chosen for structural properties such that an airfoil contour of the blade 42 is formed by securing leading and trailing edge fairings 92a, 92b to the blade spar 90 such that surfaces of the blade spar 90, leading and trailing edge fairings 92a, 92b combine to form an airfoil contour along a substantial portion of the blade spar 90.

The tip jet 50 may secure to the blade spar 90 by means of an attachment fitting 94. In the illustrated embodiment, a tip extension 96 secures to the tip jet 50 opposite the attachment fitting 94. A substantial portion of the outer surfaces of the attachment fitting 94, tip jet 50, and tip extension 96 may also conform to an airfoil contour.

Lines 98 may be coupled to the tip jet 50 in order to couple fuel and control signals, connections, actuations, or the like to the tip jet 50. The lines 98 may extend through one or more conduits 100 extending through the hub 44 and further extend from the proximal end 102 of the blade 42 toward the distal end 104 of the blade 42 to a point of coupling to the tip jet 50. One or more of the lines 98 may be captured either between the leading edge fairing 92a and between the blade spar 90, the trailing edge fairing 92b and the blade spar 90, or both.

Figure 5:
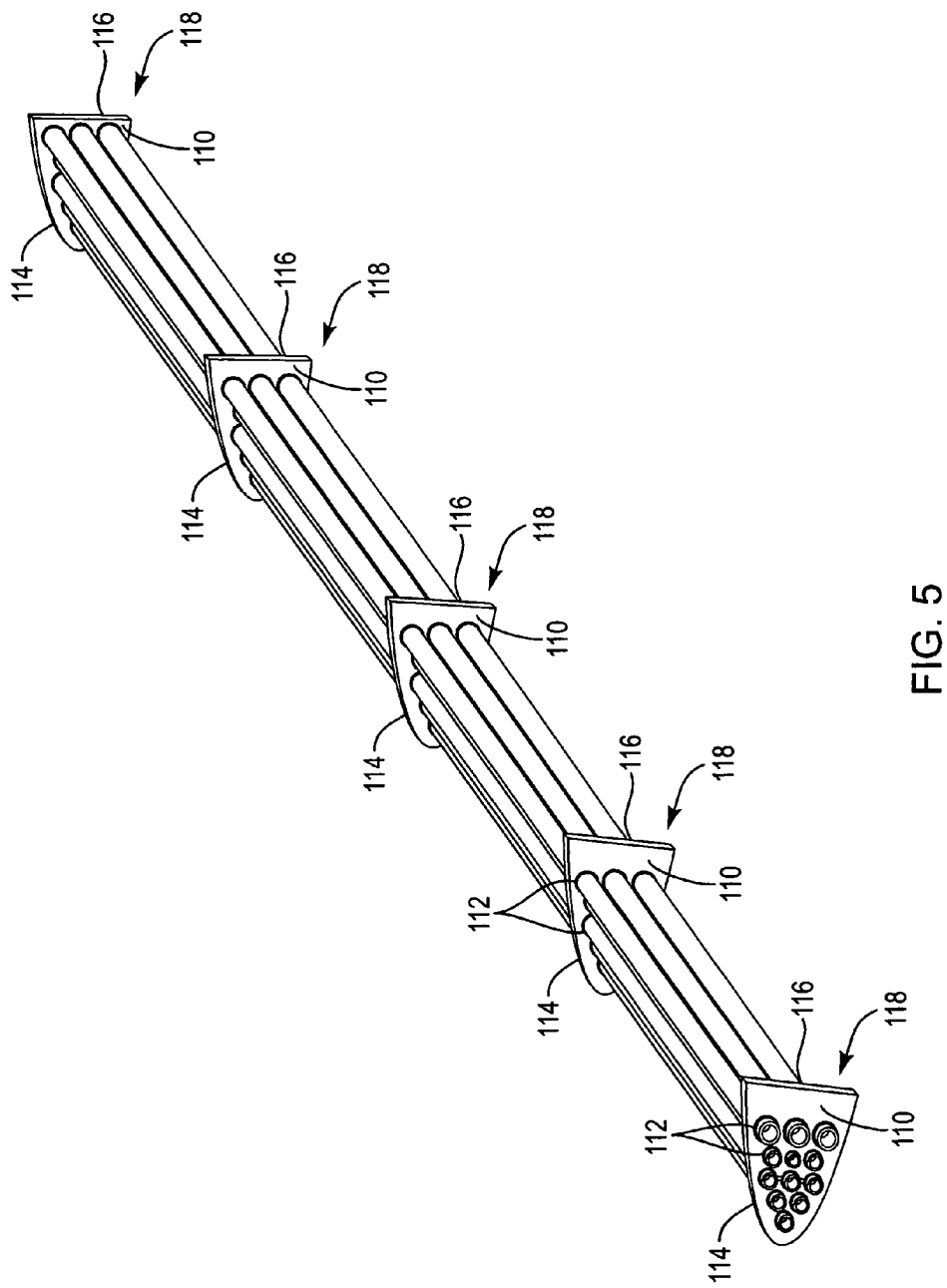
FIG. 5 is an isometric view of lines mounted within bulkheads in accordance with the present invention.

Referring to FIG. 5, the lines 98 positioned between the leading and trailing edge fairings 92a, 92b and the blade spar 90 are subject to centrifugal, bending, tangential forces due to flexing and rotation of the blades during flight. Accordingly, a plurality of bulkheads 110 may maintain the position of the lines 98 within the leading and trailing edge fairings 92a, 92b to prevent stretching of the lines 98 due to centrifugal or tangential forces and to prevent damage to the lines 98, blade spar 90, and leading and trailing edge fairings due to impact upon acceleration and deceleration of the blade 42.

The bulkheads 110 may be formed of a composite material, lightweight polymer, or the like. In general, in autorotative flight a blade 42 must have a sufficient mass to maintain the material and operational properties, such as stiffness, speed, and so forth, of the blade 42. Accordingly, the bulkheads 110 may be formed of a dense material or have a thickness greater than that needed to support loads exerted thereon in order to provide the needed mass.

The bulkheads 110 may have a generally planar shape and have one or more apertures 112 extending therethrough for receiving the lines 98. The bulkheads 110 may additionally define a convex surface 114 adapted to mate with a concave inner surface of one of the leading edge fairing 92a and trailing edge fairing 92b. The bulkheads 110 may additionally define spar mating surface 116 adapted to mate with the blade spar 90.

The presence of the bulkheads 110, the stiffness of the lines 98, and the resistance of movement of the lines 98 within the apertures 112 may alter the flexural properties of the blade 42. As known in the art of blade design, rotor blades are subject to excitation or driving energy imposed at a broad range of frequencies during flight. They may have a number of characteristic harmonic frequencies, due to their mechanical properties, at which the excitation of the blade should be avoided. In some embodiments of apparatus and methods in accordance with the present invention, each bulkhead 110 may have a location 118 chosen to tune the frequency response of the blade and shift the spectral position of harmonics of the blade 42 away from excitation frequencies to which the blade 42 is likely to be subject during flight.

Figure 6:
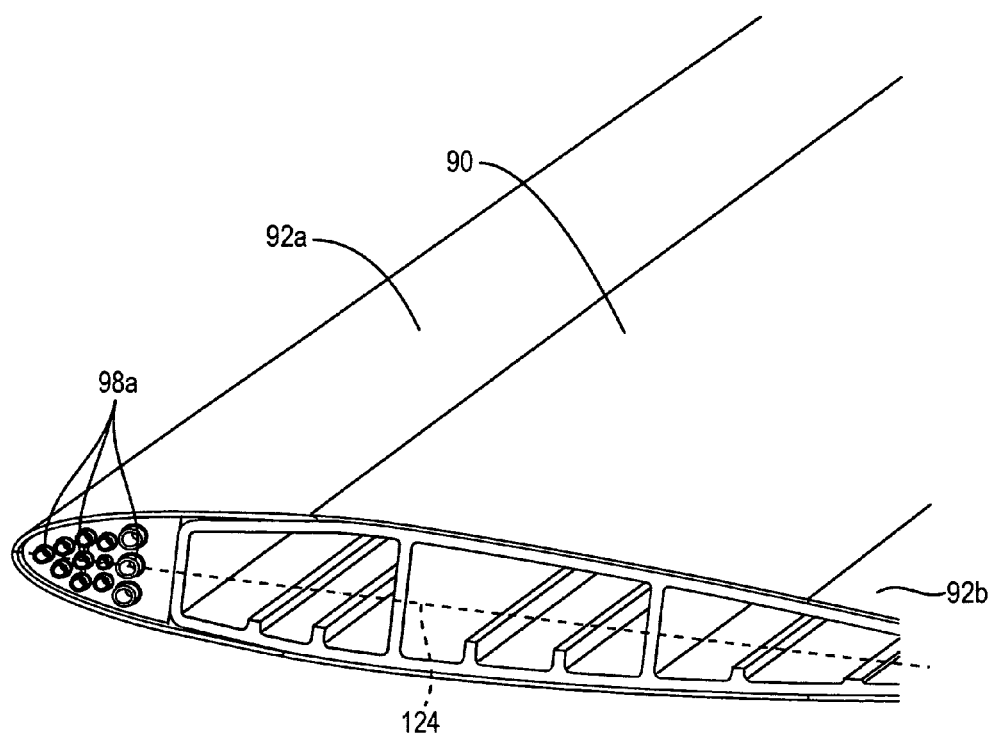
FIG. 6 is a partial cutaway isometric view of a rotor blade having lines mounted within bulkheads secured to a leading edge fairing in accordance with the present invention.

Referring to FIG. 6, the lines 98 and bulkheads 110 may be mounted between the leading edge fairing 92a and the blade spar 90. Lines 98 and bulkheads 110 may additionally or alternatively be mounted between the trailing edge fairing 92b and the blade spar 90. As shown, the convex surfaces 114 of the bulkheads 110 may abut concave inner surfaces 120 of the leading and trailing edge fairings 92a, 92b or be within some tolerance thereof. In some embodiments, the surfaces 114 are bonded to the concave inner surfaces 120 by means of an adhesive or by co-curing. Likewise, the spar mating surface 116 may abut the blade spar 90 or be within some tolerance thereof.

The lines 98 may include lines 98a intersected by a neutral bending plane 124 (e.g. neutral axis). The neutral bending plane 124 may be the bending plane for bending due to flapping and coning of the blade 42 as known in the art of rotor design. The lines 98a may include control cables for actuating the tip jet 50. Bending due to flapping and coning can be substantial. Accordingly, placing cables such that they are intersected by and travel along the neutral plane may avoid tensioning or relaxing of the cable due to bending of the blade 42.

Figures 7, 8:
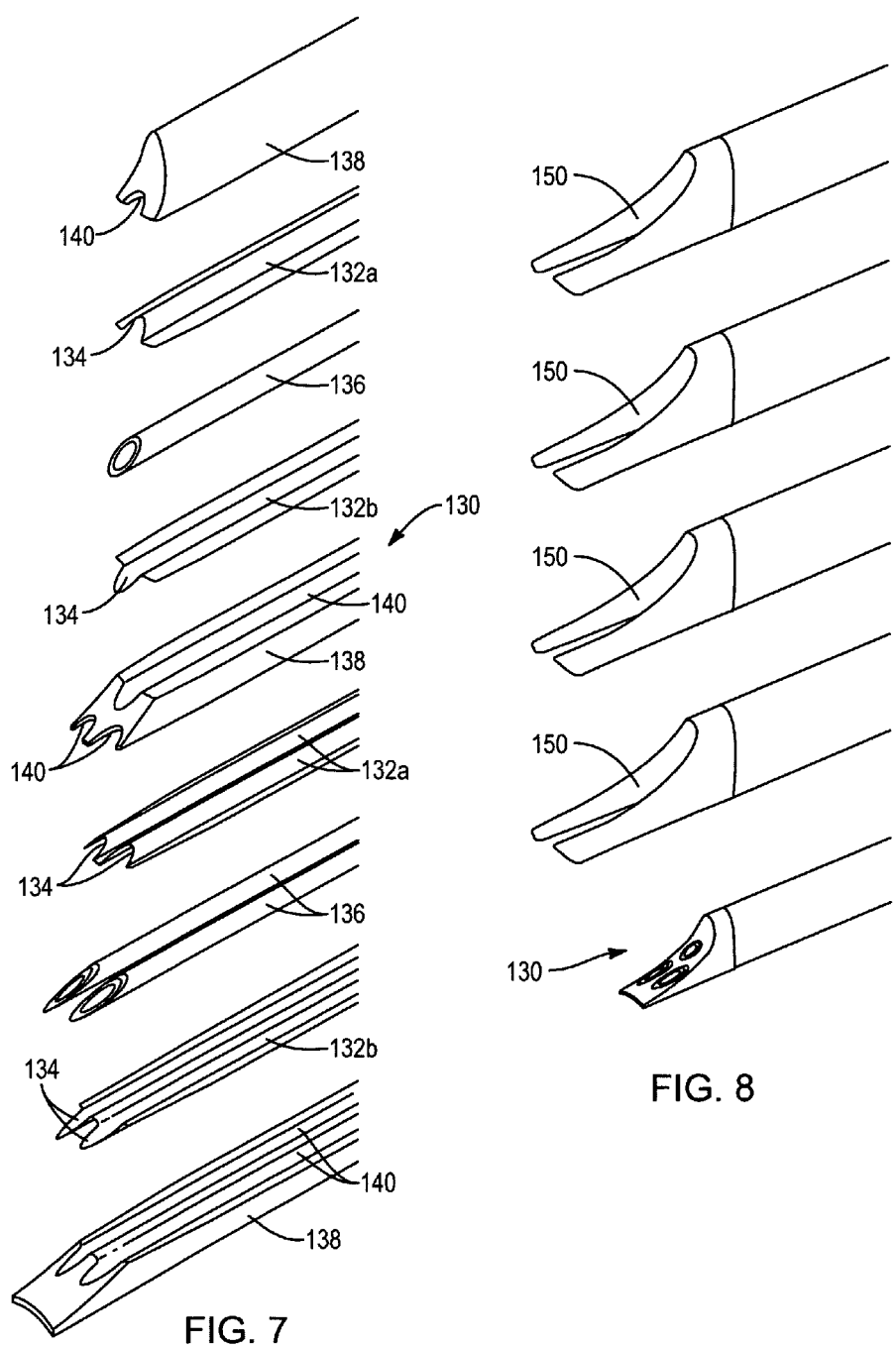
FIG. 7 is an exploded isometric view of a conduit web assembly in accordance with the present invention.
FIG. 8 is an exploded isometric view of a conduit web assembly and composite plies for forming a leading edge fairing in accordance with the present invention.

Referring to FIG. 7, in an alternative embodiment, the lines 98 may be supported within one or more conduit assemblies 130 extending along the blade 42 between the leading 92a and trailing edges 92b and the blade spar 90. In the illustrated embodiment, the conduit assemblies 130 include pairs of conduit webs 132a, 132b each having one or more grooves 134. The grooves 134 of the conduit webs 132a, 132b have concave surfaces thereof facing one another such that when the conduit webs 132a, 132b are placed in mating contact, pairs of grooves 134 define a channel for receiving a conduit 136 extending therethrough. The lines 98 may be positioned within the conduits. A plurality of pairs of conduit webs 132a, 132b may be positioned within the leading edge fairing 92a. Likewise a plurality of pairs of conduit webs 132a, 132b may be positioned within the trailing edge fairing 92b.

In some embodiments, thermally expanding material 138 (e.g., foam 138) is positioned between pairs of conduit webs 132a, 132b, between pairs of conduit webs 132a, 132b and the leading edge fairing 92a or trailing edge fairing 92b, between pairs of conduit webs 132a, 132b and the blade spar 90, or in any appropriate combination thereof. The thermally expanding material 138 may be sized to occupy the space in which it is placed when at the ambient temperature present when the conduit web assemblies 130 are assembled. The thermally expanding material 138 may additionally include grooves 140 for receiving the convex surface of the conduit webs 132a, 132b corresponding to the grooves 134.

Referring to FIG. 8, the thermally expanding material 138 may facilitate bonding of the conduit assemblies 130 to the leading edge fairing 92a and trailing edge fairings 92b. The leading edge fairing 92a may be assembled as a plurality of composite plies 150 placed over the conduit web assemblies 130. In such embodiments, the pairs of conduit web pairs 132a, 132b may be uncured prior to placement of the plies 150 over the conduit web assemblies 130.

Figure 9:
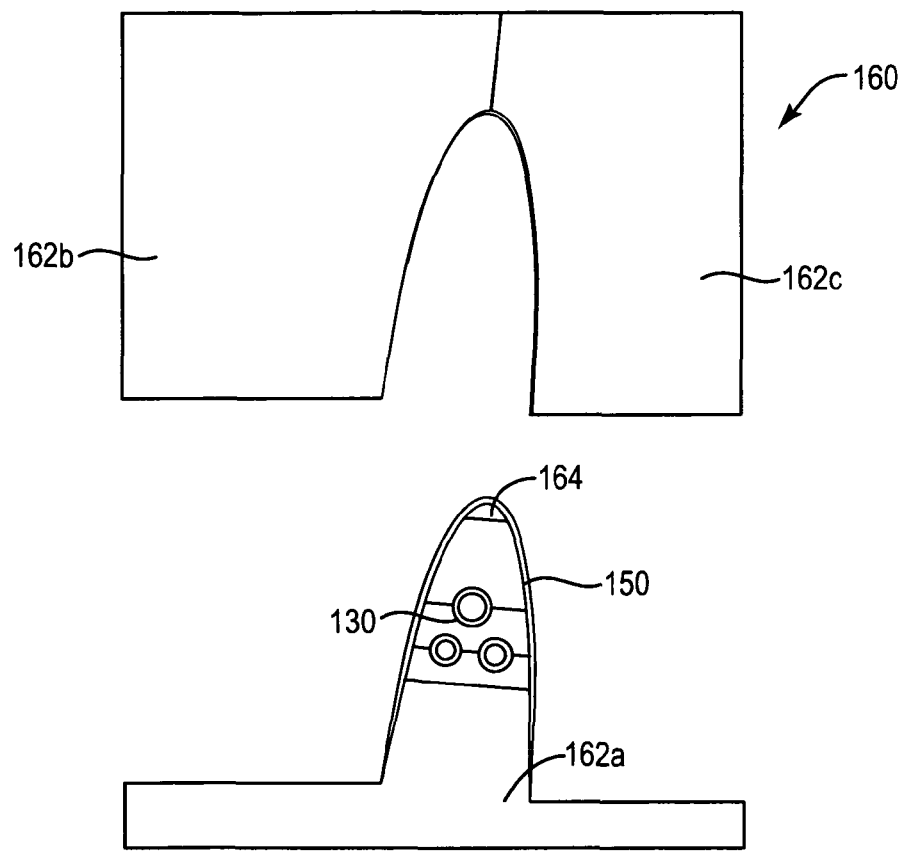
FIG. 9 is an end elevation view of a mold for forming a leading edge fairing having a conduit web assembly secured thereto in accordance with the present invention.

Referring to FIG. 9, the composite plies 150 and conduit web assemblies 130 may be placed in a vacuum bag and placed in an autoclave or placed within the illustrated mold 160. The mold 160 may include a male portion 162a that occupies a volume defined by the concave inner surface 120 of the leading and trailing edge fairings 92a, 92b. In some embodiments, a conduit web assembly 130 may be placed on the male portion 162a prior to placement of the uncured plies 150 thereover. The mold 160 may additionally include a female portion formed by one or more mold portions 162b, 162c. The mold portions 162b, 162c may be placed around the uncured plies and in engagement with the male portion 162a to form a complete mold.

The portions 162a-162c may then be retained in position by a jig or fixturing and heated in order to cure one or both of the plies 150 and the pairs of conduit webs 132a, 132b. The thermally expanding material 138 may undergo an expansion of from about 10 to about 20 percent at a peak cure temperature. It may thus operate to exert a consolidating pressure on the conduit webs 132a, 132b and plies 150. That pressure promotes good inter-ply consolidation and reduces bubbles. In some embodiments, heating elements may be embedded in the thermally expanding material or temporarily placed within the conduit 136 during the curing process.

FIG. 9 also illustrates a weight 164 positioned within the leading edge fairing. The weight 164 may be formed of metal or a high density polymer to increase the moment of inertia of the blade 42. This increases the kinetic energy stored in the blade when pre-rotated prior to takeoff and to maintain the velocity of the blade 42 during autorotative flight. It also increases dynamic stiffness by tensioning due to centrifugal force.

Figure 10A:
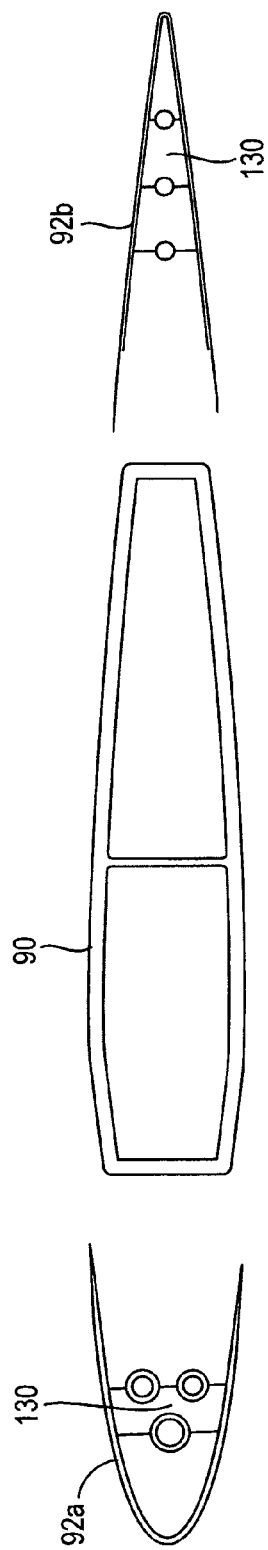
FIGS. 10A and 10B illustrate securement of leading and trailing edge fairings to a blade spar in accordance with the present invention.
Figure 10B:
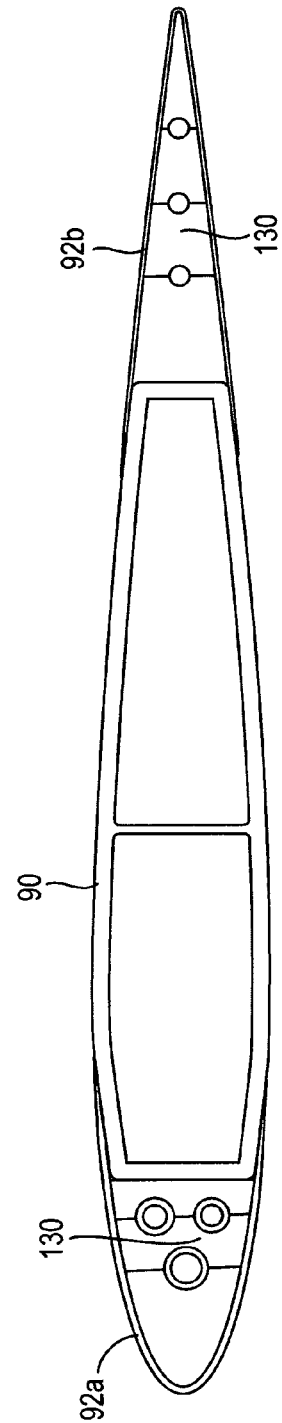

Referring to FIGS. 10A and 10B, following curing, the leading and trailing edge fairings 92a, 92b may have the conduit web assemblies 130 secured thereto, or to the bulkheads 110. The fairings 92a, 92b may then be mounted to the blade spar 90 such that each of them secures to both the upper surface and lower surface of the blade spar 90 and extends between the upper and lower surfaces of the blade spar 90.

The leading and trailing edge fairings 92a, 92b may be secured by adhesive or may be co-cured with the blade spar 90 as described in U.S. Provisional Patent Application filed Nov. 2, 2010 and entitled "ROTOR BLADE SPAR MANUFACTURING APPARATUS AND METHOD" Ser. No. 13/317,749, which is hereby incorporated herein by reference in its entirety. The step of adhering the leading and trailing edge fairings 92a, 92b by adhesives or co curing may also be performed for embodiments where the lines 98 pass through bulkheads 110 adhered to the leading and trailing edge fairings 92a, 92b.

Figure 11:
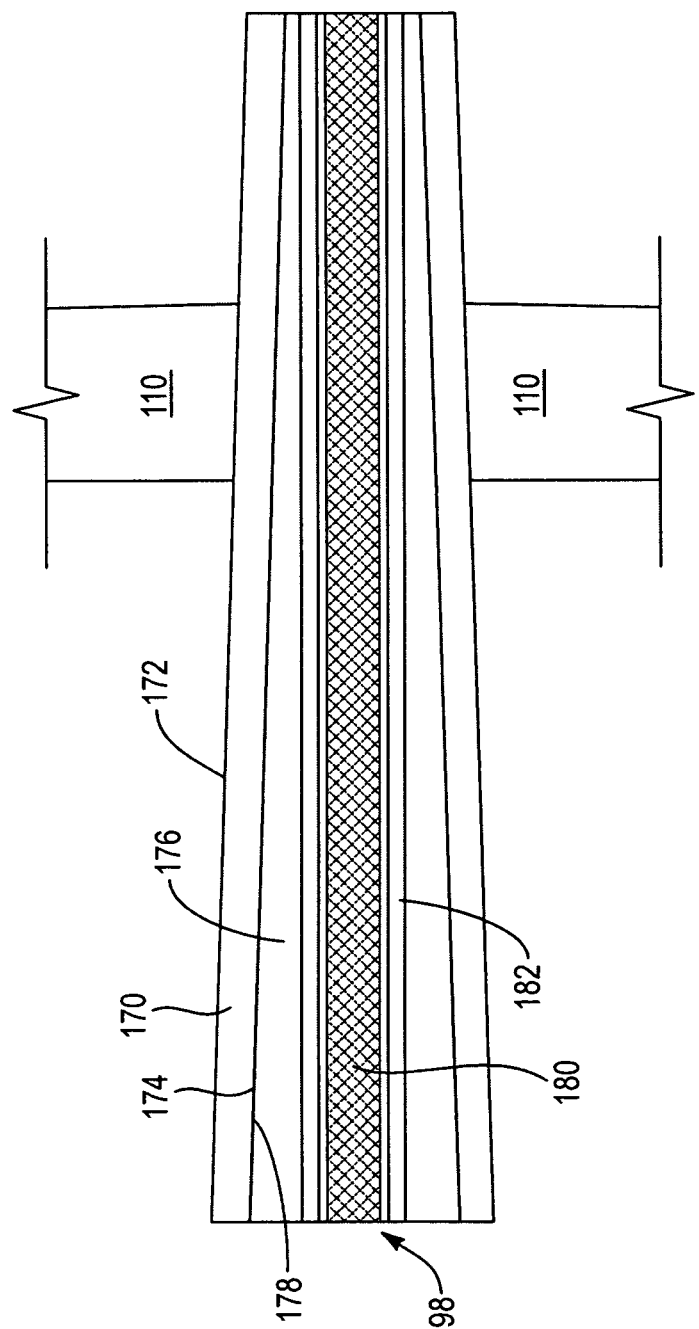
FIG. 11 is a side elevation cross-sectional view of a conduit and line engaging a bulkhead in accordance with the present invention.

Referring to FIG. 11, in some embodiments, the lines 98 may be placed within conduits 170. The conduits 170 may be tapered such that an outer surface 172 has a diameter that decreases with distance from the proximal end 102 along a substantial portion of the length thereof. The conduits 170 may also have an inner surface 174 that decreases in diameter with distance from the proximal end 102 along a substantial portion of the length thereof. Such a configuration enables the inner surface 174 of the conduit 170 to support centrifugal loads due to rotation of the blade 42 during flight.

The lines 98 may be bonded to a fitting 176, or be placed within a fitting 176, having a tapered outer surface 178 that has a diameter that decreases with distance from the proximal end 102 along a substantial portion of the length thereof. For example, where the line 98 is embodied as a cable 180, the fitting 176 may be bonded to a sheath 182 surrounding the cable 180, or the fitting 176 may serve as the sheath. The outer surface 178 may be sized to mate with the tapered inner surface 174. Thus, the tapered inner surface is able to resist movement of the fitting 176 due to centrifugal loads. However, by exerting a force toward the proximal end, the fitting 176 and line 98 may be removed for servicing or replacement.

Figure 12:
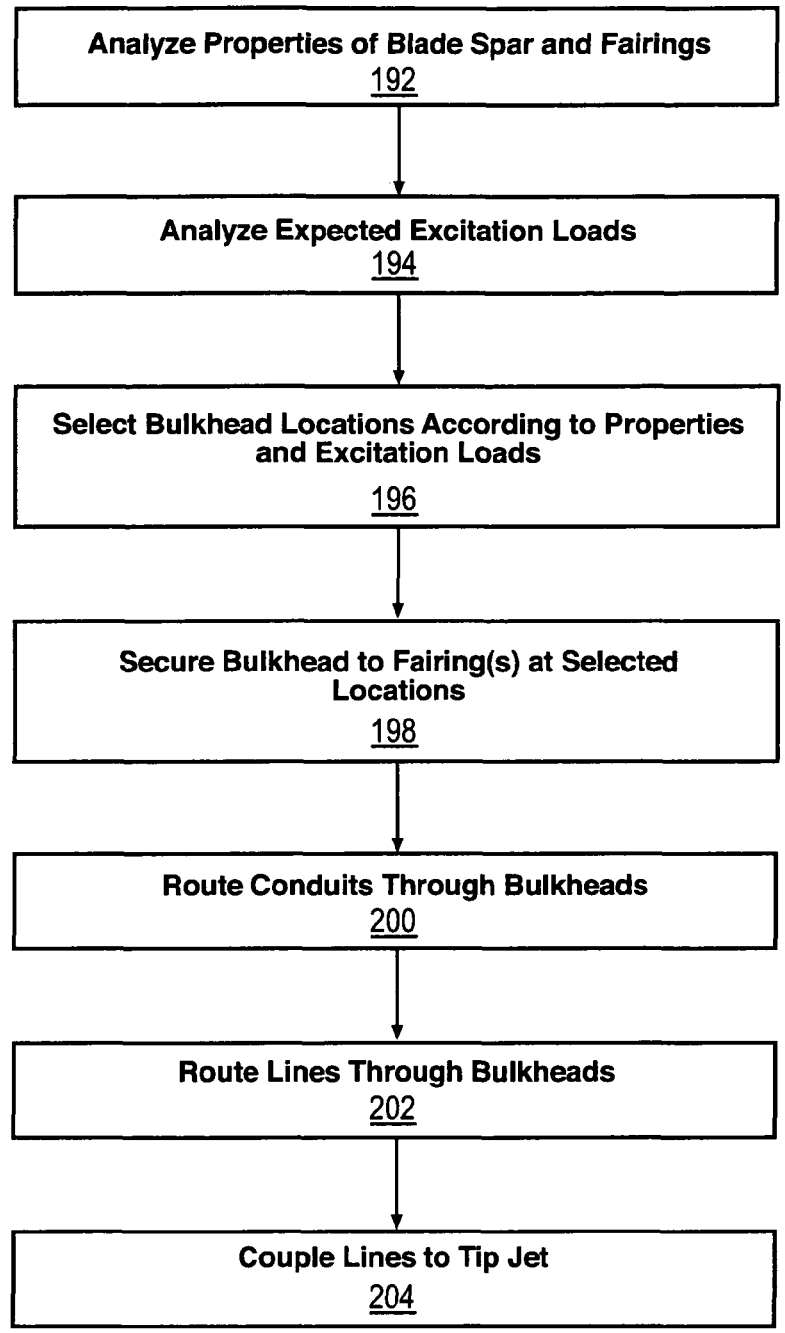
FIG. 12 is a process flow diagram of a method for manufacturing a rotor blade in accordance with the present invention.

Referring to FIG. 12, a method 190 may be used for mounting lines within a rotor blade 42. The method 190 may include analyzing 192 the properties of the blade spar 90 and leading and trailing edge fairings 92a, 92b, either alone or as an assembly. The properties analyzed 192 may include structural properties and frequency response of the blade spar 90 and leading and trailing edge fairings 92a, 92b. The expected excitation loads may be analyzed 194. Analyzing 194 may include evaluating the frequency of the expected excitation loads with respect to the frequency response of the blade spar 90 and leading and trailing edge fairings 92a, 92b. Analysis 194 may determine if the excitation frequencies correspond to any resonant frequencies of the blade spar 90 and leading and trailing edge fairings 92a, 92b. Analyzing 194 may include determining optimum structural, flexural, frequency response, and weight distribution properties in view of the expected excitation loads.

The locations 118 of the bulkheads 110 may then be selected 196. These 118 may be chosen to tune the frequency response and flexural properties of the assembled blade 42. In view of the analyzing 192, 194, resonant frequencies of the frequency response of the blade 42 should not correspond with excitation frequencies of the expected excitation load. Selecting 196 may include selecting 196 the locations 118 such that the one or more of the flexural, frequency response, and weight distribution properties of the blade 42 are within a tolerance of optimum properties.

The conduits 170 may then be passed 200 through the bulkheads 110 and may be bonded thereto. Lines 98 may then be passed 202 through the conduits 170. Lines may include electrical lines, cables, fuel lines, and the like. The lines 98 may then be coupled 204 to the tip jet 50.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A rotor blade for a rotorcraft comprising:
    a blade spar having upper and lower surfaces;
    a leading edge fairing secured to the blade spar and extending between the upper and lower surfaces;
    a trailing edge fairing secured to the blade spar opposite the leading edge fairing and extending between the upper and lower surfaces;
    the upper and lower surfaces, leading edge fairing, and trailing edge fairing further defining an airfoil contour; and
    at least one conduit extending between at least one of the leading edge fairing and the blade spar and the trailing edge fairing and the blade spar;
    wherein—
        the blade spar further defines a proximal end and a distal end thereof;
        a tip jet is mounted at the distal end of the blade spar;
        a control line extends through the conduit and is coupled to the tip jet;
        the control line is at least one of a fuel line, an electrical line, and a cable; and
        the control line is a cable intersected by a neutral bending plane of the rotor blade.

2. The rotor blade of claim 1, wherein the blade spar defines a duct in fluid communication with an intake of the tip jet.

3. The rotor blade of claim 1, further comprising:
    a plurality of bulkheads positioned between at least one of the leading edge fairing and the blade spar and the trailing edge fairing and the blade spar;
    the at least one conduit extending through the plurality of bulkheads; and
    the plurality of bulkheads engaging one or more of the blade spar, leading edge fairing, and trailing edge fairing to support the conduit.

4. The rotor blade of claim 3, wherein the locations of the bulkheads are effective to maintain one or more of frequency response properties, flexural properties, and weight distribution properties of the rotor blade within a tolerance of optimum values.

5. The rotor blade of claim 1, further comprising:
    the at least one conduit further comprising a tapered inner surface;
    a tapered fitting positioned within the at least one conduit in engagement with the tapered inner surface; and
    the cable positioned within the fitting.

6. The rotor blade of claim 5, further comprising:
    a sheath positioned within the fitting and bonded to the fitting; and
    the cable further positioned within the sheath.

7. A rotor blade for a rotorcraft comprising:
    a blade spar having upper and lower surfaces;
    a leading edge fairing secured to the blade spar and extending between the upper and lower surfaces;
    a trailing edge fairing secured to the blade spar opposite the leading edge fairing and extending between the upper and lower surfaces;
    the upper and lower surfaces, leading edge fairing, and trailing edge fairing further defining an airfoil contour;
    at least one conduit extending between at least one of the leading edge fairing and the blade spar and the trailing edge fairing and the blade spar; and
    at least one web engaging each of the at least one conduit and securing the at least one conduit to one of the leading edge fairing and the trailing edge fairing.

8. The rotor blade of claim 7, wherein the at least one web and the leading and trailing edge fairings comprise a composite material.

9. The rotor blade of claim 8, wherein the web is bonded to one of the leading and trailing edge fairings by co-curing.

10. The rotor blade of claim 9, further comprising thermally expandable foam positioned between the web and one of the leading and trailing edge fairings.

11. A method for manufacturing a rotor blade for a rotorcraft, the method comprising:
    placing a plurality of bulkheads within one of a leading edge fairing and a trailing edge fairing;
    placing a conduit extending through the plurality of bulkheads;
    securing the leading and trailing edge fairings to a blade spar having the conduit and bulkheads positioned between one of the leading edge fairing and the blade spar and the trailing edge fairing and the blade spar;
    analyzing flexural properties and frequency response properties of the blade spar and leading and trailing edge fairings;
    analyzing flexural loads and loading frequencies of the rotor blade;
    calculating positions of the bulkheads according to the analysis of the flexural properties and frequency response properties of the blade spar and leading and trailing edge fairings and the analysis of the flexural loads and loading frequencies of the rotor blade; and
    positioning the bulkheads to be spaced along the conduit according to the calculated positions.

12. The method of claim 11, further comprising routing at least one control line through the conduit.

13. The method of claim 12, further comprising:
    securing a tip jet proximate a distal end of the blade spar; and
    coupling the at least one control line to the tip jet.

14. The method of claim 13, wherein the blade spar defines a duct in fluid communication with an intake of the tip jet.

15. A method for manufacturing a rotor blade for a rotorcraft, the method comprising:
    laying up composite plies to form a fairing corresponding to one of a leading and trailing edge of an airfoil contour;

laying up composite plies to form a conduit web;
positioning the conduit web within the fairing;
co-curing the conduit web and fairing; and
securing the fairing to a blade spar, the blade spar and fairing having respective outer surfaces conjoined and forming an aerodynamically continuous part of an airfoil contour.

16. The method of claim 15, wherein:
the method further comprises placing a thermally expanding foam adjacent opposing sides of the conduit web; and
the conduit web comprises first and second layers each including opposing concave surfaces defining a conduit.

* * * * *